(12) United States Patent
Briglia et al.

(10) Patent No.: US 9,393,515 B2
(45) Date of Patent: Jul. 19, 2016

(54) METHOD AND APPLIANCE FOR PURIFYING A FLOW RICH IN CARBON DIOXIDE

(75) Inventors: Alain Briglia, Corze (FR); Philippe Court, Vincennes (FR); Arthur Darde, Paris (FR); Ludovic Granados, Puteaux (FR); Jean-Pierre Tranier, L'Hay-les-Roses (FR); Xavier Traversac, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 286 days.

(21) Appl. No.: 13/885,849

(22) PCT Filed: Nov. 14, 2011

(86) PCT No.: PCT/FR2011/052631
§ 371 (c)(1),
(2), (4) Date: May 16, 2013

(87) PCT Pub. No.: WO2012/066221
PCT Pub. Date: May 24, 2012

(65) Prior Publication Data
US 2013/0233171 A1   Sep. 12, 2013

(30) Foreign Application Priority Data

Nov. 16, 2010   (FR) ..................................... 10 59389
Jul. 25, 2011   (FR) ..................................... 11 56755

(51) Int. Cl.
*B01D 53/00*   (2006.01)
*F25J 3/02*    (2006.01)
*F25J 3/06*    (2006.01)

(52) U.S. Cl.
CPC ............ *B01D 53/002* (2013.01); *F25J 3/0223* (2013.01); *F25J 3/0266* (2013.01); *F25J 3/067* (2013.01);
(Continued)

(58) Field of Classification Search
CPC ............... B01D 2256/22; B01D 53/002; F25J 2200/02; F25J 2200/70; F25J 2205/04; F25J 2210/70; F25J 2215/04; F25J 2220/82; F25J 2230/30; F25J 2240/90; F25J 2245/02; F25J 2270/02; F25J 2270/12; F25J 2270/80; F25J 2290/40; F25J 3/0223; F25J 3/0266; F25J 3/0625; F25J 3/067; Y02C 10/12
See application file for complete search history.

(56) References Cited

U.S. PATENT DOCUMENTS

2002/0116945 A1   8/2002   Buckland
2008/0173585 A1   7/2008   White et al.
2009/0013868 A1*  1/2009   Darde et al. ...................... 95/42

FOREIGN PATENT DOCUMENTS

EP   1953486 A1   8/2008
FR   2872890 A1   1/2006
(Continued)

OTHER PUBLICATIONS

John L. Dillon, et al.; "Integrated Air Booster and Oxygen Compressor for Partial Pumped LOX Cryogenic Air Separation Process Cycle (John L. Dillon, Air Products and Chemicals, Inc.)"; Research Disclosure, Mason Publications, Hampshire, GB, vol. 403, No. 80; Nov. 1, 1997; XP007122181; ISSN: 0374-4353.

*Primary Examiner* — Duane Smith
*Assistant Examiner* — Cabrena Holecek
(74) *Attorney, Agent, or Firm* — Elwood L. Haynes

(57) ABSTRACT

In a method for purifying a flow rich in carbon dioxide and containing at least one impurity lighter than carbon dioxide, the flow is cooled in a heat exchanger (7) and partially condensed, the partially condensed flow is sent to a first phase separator (9) operating under a first pressure, a gas from the first phase separator is compressed and sent to a second phase separator (31) operating under a second pressure higher than the first pressure, a first liquid (11) is sent from the first phase separator to a housing (15) operating under a pressure lower than the first pressure, and a second liquid (33) is sent to the housing.

5 Claims, 4 Drawing Sheets

(52) U.S. Cl.
CPC ............ *F25J 3/0625* (2013.01); *B01D 2256/22* (2013.01); *F25J 2200/02* (2013.01); *F25J 2200/70* (2013.01); *F25J 2205/04* (2013.01); *F25J 2210/70* (2013.01); *F25J 2215/04* (2013.01); *F25J 2220/82* (2013.01); *F25J 2230/30* (2013.01); *F25J 2240/90* (2013.01); *F25J 2245/02* (2013.01); *F25J 2270/02* (2013.01); *F25J 2270/12* (2013.01); *F25J 2270/80* (2013.01); *F25J 2290/40* (2013.01); *Y02C 10/12* (2013.01)

(56) References Cited

FOREIGN PATENT DOCUMENTS

| | | |
|---|---|---|
| FR | 2934170 A3 | 1/2010 |
| WO | 2008099357 A1 | 8/2008 |
| WO | 2009007937 A2 | 1/2009 |
| WO | 2009007938 A2 | 1/2009 |

\* cited by examiner

METHOD AND APPLIANCE FOR PURIFYING A FLOW RICH IN CARBON DIOXIDE

CROSS-REFERENCE TO RELATED APPLICATIONS

This application is a §371 of International PCT Application PCT/FR2011/052631 filed Nov. 14, 2011, which claims §119(a) foreign priority to French patent application 1059389, filed Nov. 16, 2010.

FIELD OF THE INVENTION

The present invention relates to a process and to an appliance for the purification of a flow rich in carbon dioxide.

BACKGROUND

A flow rich in carbon dioxide comprises at least 20% vol. of carbon dioxide, indeed even at least 40% vol. of carbon dioxide, indeed even at least 50% vol. of carbon dioxide or even at least 60% vol. or at least 70% vol. of carbon dioxide.

The flow is cooled and partially condensed in an appliance for the purification of a flow rich in carbon dioxide. The liquid phase thus formed is enriched in carbon dioxide and the gas phase is enriched in at least one lighter component which can be oxygen, nitrogen, argon, carbon monoxide, hydrogen, methane, and the like, depending on the composition of the flow to be purified.

An appliance for the purification of a flow rich in carbon dioxide known from WO-A-20090007937 comprises several phase separators, two being connected in series.

SUMMARY OF THE INVENTION

According to the invention, the appliance can comprise at least two phase separators operating at different pressures in order to improve the efficiency of the separation.

According to a subject matter of the invention, provision is made for a process for the purification of a flow rich in carbon dioxide and comprising at least one impurity which is lighter than carbon dioxide, in which:
i) the flow is cooled in a heat exchanger and partially condensed
ii) the partially condensed flow is sent to a first phase separator operating at a first pressure
iii) a gas from the first phase separator is reheated, compressed, cooled and sent to a second phase separator operating at a second pressure greater than the first pressure
iv) a first liquid is reduced in pressure and sent from the first phase separator to a chamber operating at a pressure lower than the first pressure
v) a second liquid originating from the second phase separator or a third liquid derived from the second liquid is reduced in pressure and sent to the chamber and
vi) a purified liquid rich in carbon dioxide exits from the chamber.

The liquid sent from the first phase separator to the chamber can be composed of the first liquid mixed with the third liquid, as illustrated for FIG. 3. The third liquid is derived from the second liquid by separation in the first phase separator.

According to other optional characteristics:
the second liquid is reheated, optionally in the heat exchanger, then reduced in pressure in a valve down to the pressure of the chamber and sent to the chamber,
the second phase separator operates at a lower pressure than the inlet of the second liquid into the exchanger, because of a hydrostatic pressure due to the position of the second phase separator above the inlet of the second liquid into the exchanger,
the second liquid is reduced in pressure first to an intermediate pressure between the second pressure and the pressure of the chamber and subsequently down to the pressure of the chamber,
the second liquid is reduced in pressure down to the first pressure and sent to the first phase separator, and the third liquid derived from the second liquid is sent from the first phase separator to the chamber,
the process produces a liquid final product rich in carbon dioxide,
the chamber is a phase separator,
the chamber is a distillation or washing column,
the inlet temperature of the compressor is substantially equal to the inlet temperature of the flow to be cooled in the heat exchanger.

According to another subject matter of the invention, provision is made for an appliance for the purification of a flow rich in carbon dioxide and comprising at least one impurity which is lighter than carbon dioxide, comprising a chamber, a compressor, a first phase separator, a second phase separator, a heat exchanger, a pipe for sending the flow rich in carbon dioxide to be cooled into the heat exchanger, a pipe for conveying the cooled flow from the exchanger to the first phase separator, means for conveying a gas from the first phase separator to the heat exchanger in order to be reheated, means for conveying this gas from the heat exchanger to the compressor, a pipe for conveying the gas from the compressor to the heat exchanger, a pipe for conveying the compressed gas from the heat exchanger to the second phase separator, a pipe for conveying a first liquid from the first phase separator to the chamber, a valve for reducing the first liquid in pressure upstream of the chamber, a pipe for bringing about the exit of a purified liquid rich in carbon dioxide from the chamber and
i) means for withdrawing a second liquid from the second phase separator and for conveying the second liquid to the chamber and a valve for reducing the second liquid in pressure upstream of the chamber or
ii) a pipe for withdrawing the second liquid from the second phase separator and for sending it to the first phase separator, a pipe for conveying a third liquid derived from the second liquid from the first phase separator to the chamber and a valve for reducing the third liquid in pressure upstream of the chamber.

According to other optional characteristics:
the means for withdrawing the second liquid from the second phase separator and for conveying the second liquid to the chamber are composed of a pipe connected to an inlet point of the exchanger and to the second phase separator and a pipe connected to an intermediate point of the exchanger and to the chamber,
the inlet point of the exchanger is below the withdrawal point of the second liquid from the second phase separator,
the appliance comprises means for reducing the second liquid in pressure to an intermediate pressure lower than the operating pressure of the second phase separator and means for reducing in pressure the second liquid or a third liquid derived from the second liquid to the pressure of the chamber,
the appliance comprises means connecting the second phase separator to the first phase separator in order to make possible the passage of liquid, the chamber is a distillation or washing column,
the chamber is a third separation vessel.

The gas from a first phase separator can be compressed to a higher pressure and recondensed, optionally at the same temperature.

When the carbon dioxide is required at high purity (more than 98% vol.), a distillation column may be necessary. In this case, all the liquid flows originating from the phase separators are reduced in pressure and conveyed to a phase separator or the distillation column. In this case, during the reduction in pressure of the flow at the higher pressure, it may be desirable to operate at a temperature close to the solidification temperature in order to increase the output of pure carbon dioxide. The liquid which is cooled during the reduction in pressure may then solidify. Even if the partial pressure is such that the carbon dioxide does not solidify, the temperature reached might be too low for the other fluids present in the separator or the distillation column; thus, it would be the mixture in the separator or the column which might partially freeze. Alternatively, a liquid pipeline installed in the cold box close to a carbon dioxide pipeline might freeze.

The main risk is not so much the complete solidification of the liquids rich in carbon dioxide but rather the formation of needles of carbon dioxide which might damage the pipelines (in particular in the bends) and the instrumentation (valves, sensors, and the like).

The basic solution is to avoid excessively cooling the flow at higher pressure so that the liquid phase can be reduced in pressure without risk.

This approach reduces the carbon dioxide output of the process as it reduces the pressure and the temperature of a partial condensation.

One solution is to gently heat at least one liquid at higher pressure upstream of the reduction in pressure, so that it remains above the solidification point. This approach complicates the heat exchanger which cools the liquid.

In this case, it is envisaged to install the phase separators and the heat exchanger so that there is sufficient hydrostatic height to prevent the evaporation of the liquid. If the liquid from the separator is heated, even a little, at the same pressure, it will immediately begin to evaporate. A higher pressure is required in order for the liquid to remain liquid at the higher temperature.

Yet another solution is to reduce in pressure at least one of the liquids at the higher pressure in stages.

One possibility is to reduce in pressure the liquid at higher pressure in an intermediate phase separator, the liquid of which is sent to the column.

One advantage of this solution is that it reduces the number of pipes in the cold box and the number of connections to the column and the number of connections on the main exchanger and, finally, the arrangement constraints related to hydrostatic height requirements.

DETAILED DESCRIPTION OF THE INVENTION

Figure 1:
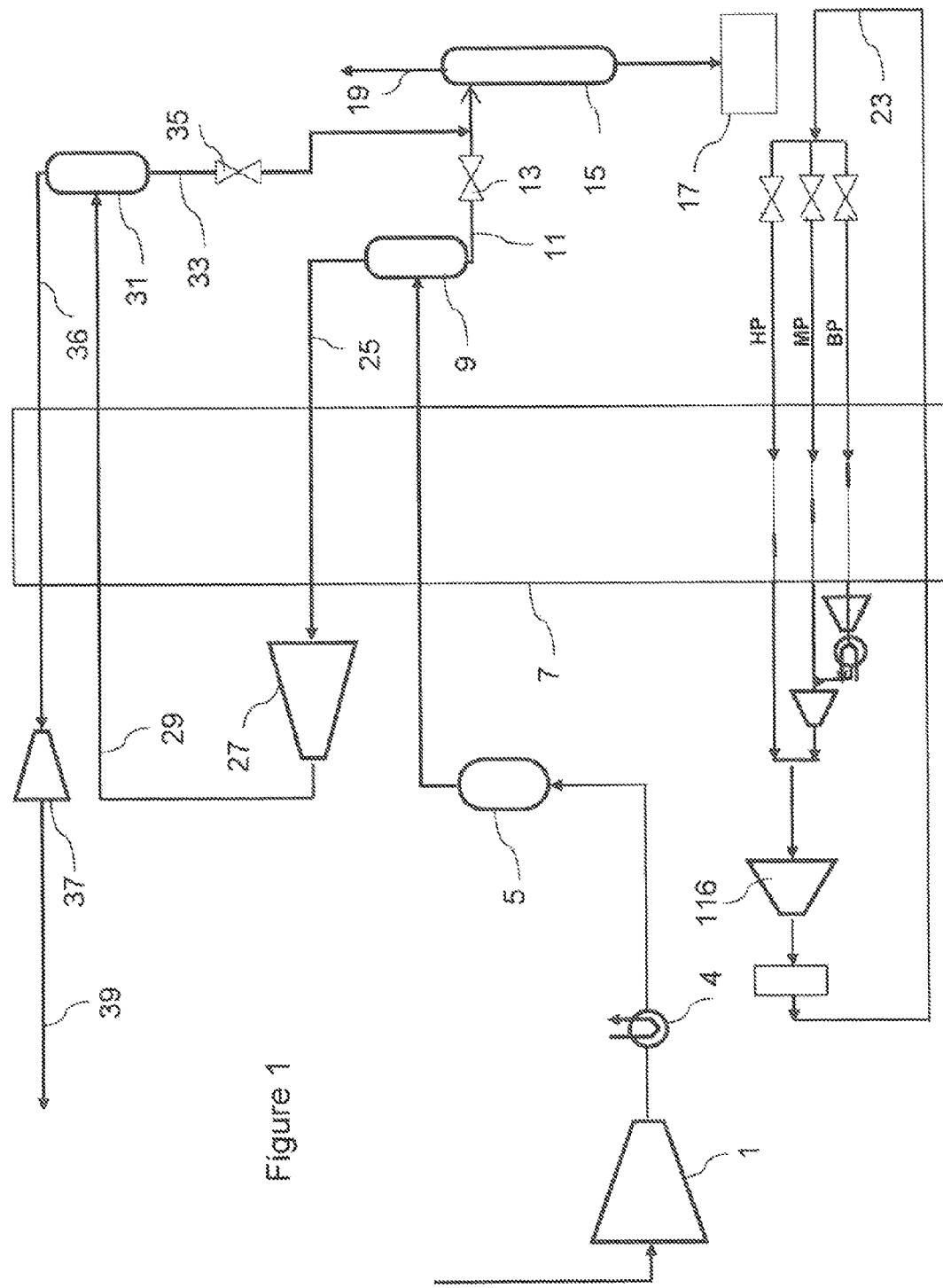
FIG. 1 is a schematic representation of one embodiment of the present invention.

In FIG. 1, a compressor 1 compresses a flow rich in carbon dioxide, comprising at least 20% vol. of carbon dioxide, indeed even at least 40% vol. of carbon dioxide, optionally at least 60% vol. of carbon dioxide, and at least one light impurity which can be oxygen, nitrogen, argon, carbon monoxide, hydrogen, methane or several of these impurities. The flow can originate, for example, from an oxy-combustion, from a steelworks, from a cement works, from an SMR, and the like.

After the compression to a pressure between 8 and 40 bar abs, the flow is cooled in the cooler 4, purified from water in the adsorption unit 5 and then sent to be cooled in the exchange line 7, which can be composed of a plate and fin exchanger made of brazed aluminum.

The cooled and partially condensed flow is sent to a first phase separator 9. The first liquid 11 from the first phase separator 9 is reduced in pressure in a valve 13 and then sent to a chamber operating at lower pressure than the first phase separator, which can be a third phase separator 15.

A liquid very rich in carbon dioxide 17, comprising less in the way of impurities than the flow compressed in the compressor 1, is produced in the third phase separator 15.

A gas rich in at least one impurity 19 exits from the third phase separator 15 and can be reheated in the exchange line 7.

The gas 25 from the first phase separator 9 is reheated in the exchange line 7 and compressed in the compressor 27 to form a compressed gas 29 at a pressure between 5 and 50 bar higher than the preceding compression pressure. The gas 29 is cooled in the exchange line 7 and is sent to a second phase separator 31. The second liquid 33 from the second phase separator is reduced in pressure in a valve 35 down to the pressure of the chamber 15. The gas 36 from the second phase separator 31 is reheated in the exchange line 7, is reduced in pressure in a turbine 37 and exits from the appliance as gas 39.

The exchange line 7 and the phase separators 9, 15, 31 occur inside an isolated chamber (not illustrated) in order to make possible the operation at a temperature below ambient temperature.

The cold behavior of the appliance is provided by a refrigeration cycle 23 involving three compressors in order to compress a cycle gas to three pressures, the cycle gas being cooled and reheated in the exchange line. Other methods for producing cold can be envisaged.

Figure 2:
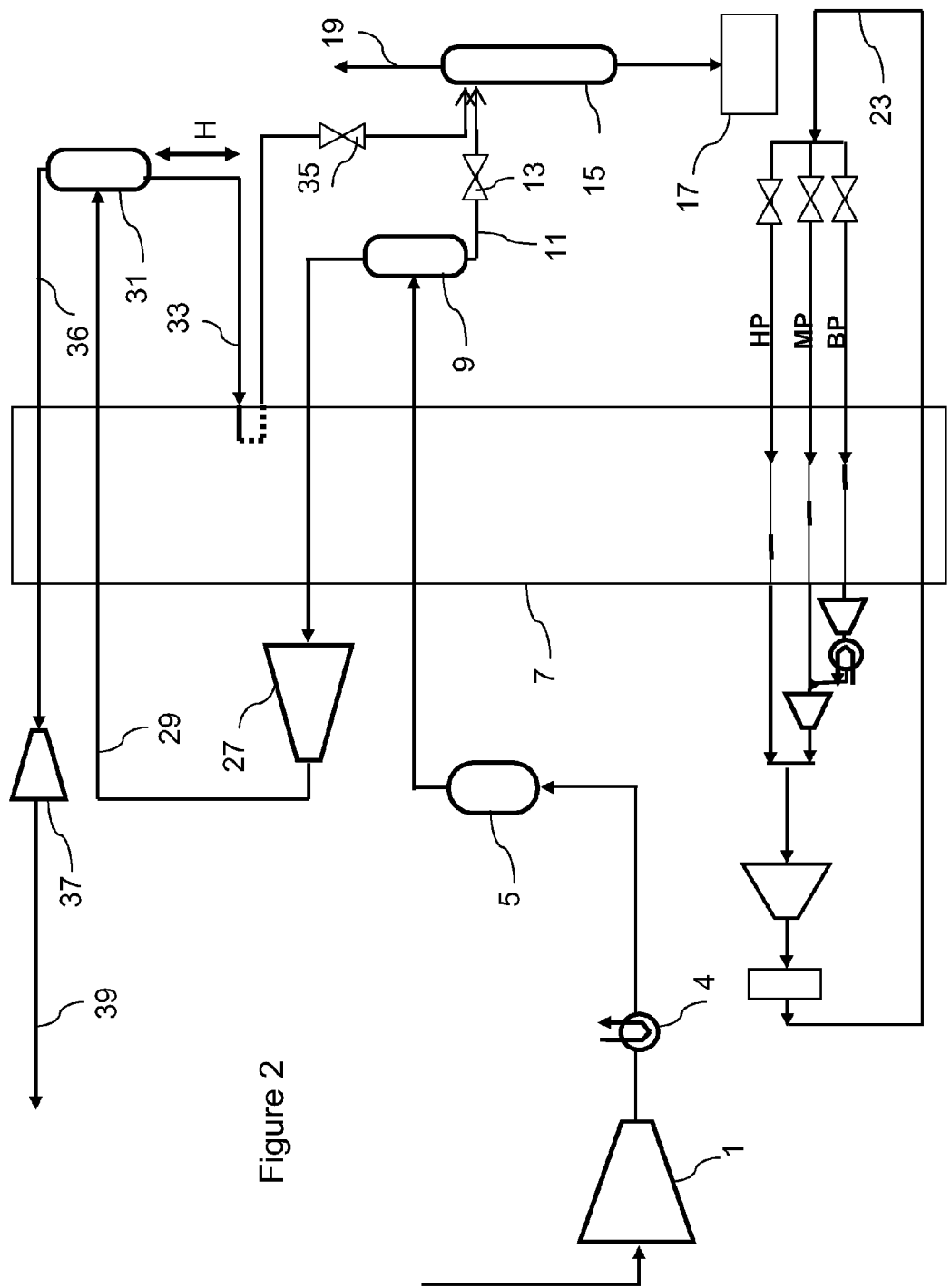
FIG. 2 is a schematic representation of one embodiment of the present invention.

FIG. 2 differs from FIG. 1 in that it shows a means for preventing the solidification of carbon dioxide. The second liquid 33 exiting from the second phase separator 31, operating at the highest pressure than the first phase separator, is reheated in the exchange line 7 and exits from the latter at a warmer temperature than the cold end of the exchange line (indicated by dotted lines, in order to show that the reheated second liquid 33 is not cooled in the exchanger).

In addition, the second phase separator 31 can be positioned at a height H above the inlet of the second liquid into the exchange line 7 in order to ensure that the pressure of the liquid 33 is sufficient to prevent it from evaporating in the exchange line 7.

If the pressure of the liquid 33 is reduced in pressure in the valve 35 down to 10 bars abs, it is necessary to reheat the liquid in the exchange line 7 beforehand, in order to avoid falling below −54.5° C., and, in order to prevent the formation of gas on reducing in pressure, the hydrostatic height corresponding to a height H between 2.9 m and 44 m is necessary, according to the composition of the liquid.

If the pressure of the liquid 33 exiting from the valve 35 is at 20 bar abs, the reduction in pressure brings about formation of gas but it is not necessary to send this liquid to the exchange line 7 beforehand as the temperature is sufficiently high to prevent the formation of solids.

Figure 3:
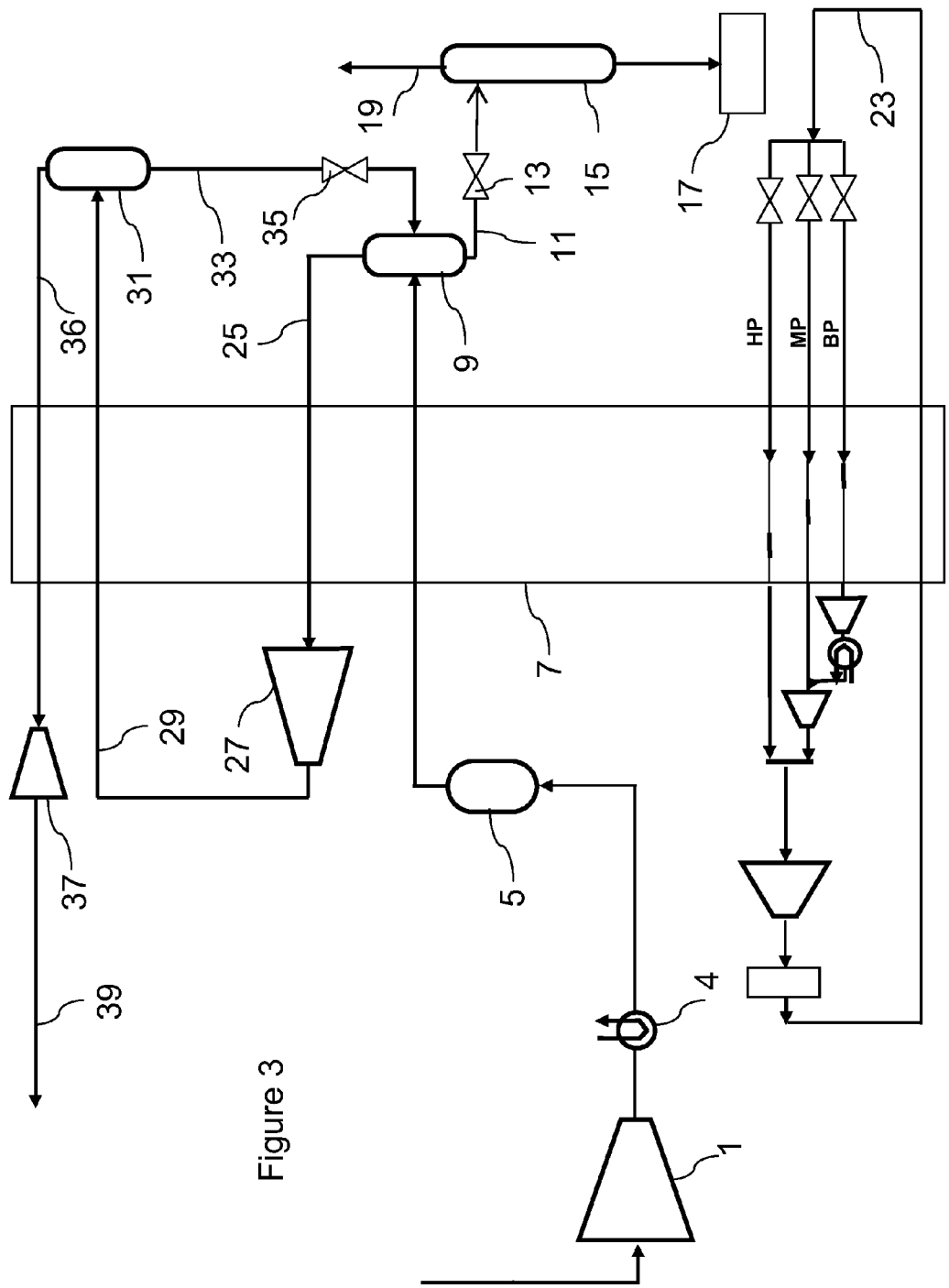
FIG. 3 is a schematic representation of one embodiment of the present invention.

FIG. 3 differs from FIG. 1 in that the liquid 33 from the second phase separator is not sent directly to the third phase separator 15 after it has been reduced in pressure in the valve 35 but is sent to the first phase separator. Thus, the valve 35 reduces the liquid 33 in pressure to an intermediate pressure between that of the second separator 31 and that of the chamber, thus reducing the fall in temperature.

The liquid sent from the first phase separator to the chamber 15 is thus in this case composed of the first liquid and of the third liquid. The third liquid is derived from the second liquid by separation in the first phase separator.

The chamber, which operates at lower pressure than the first pressure, can be the third phase separator 15 or, if not, a distillation or washing column if the liquefied product 17 has to be purer.

Figure 4:
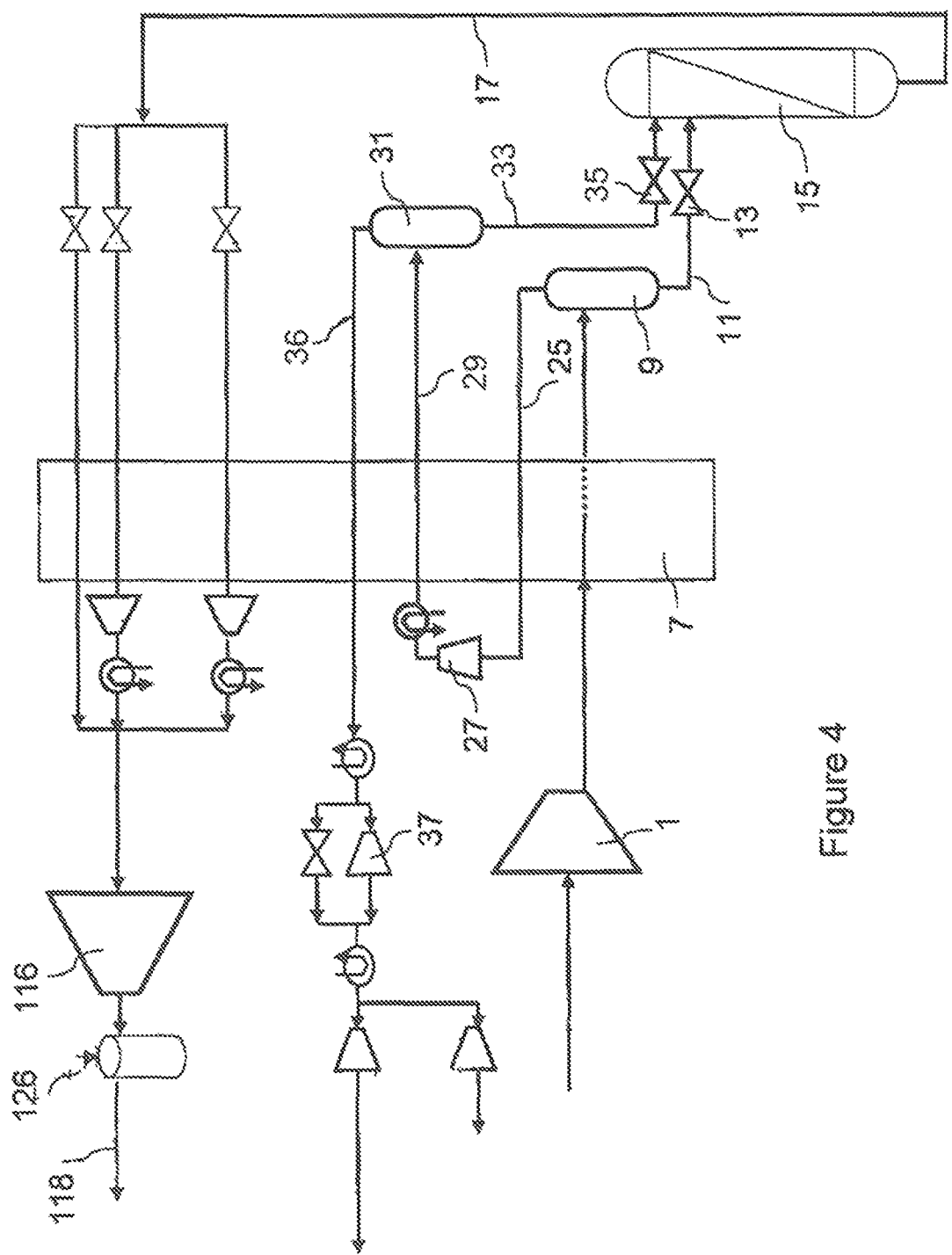
FIG. 4 is a schematic representation of one embodiment of the present invention.

In FIG. 4, a compressor 1 compresses a flow rich in carbon dioxide, comprising at least 20% vol. of carbon dioxide, indeed even at least 40% vol. or at least 50% vol. of carbon dioxide, optionally at least 60% vol. or at least 70% vol. of carbon dioxide, and at least one light impurity which can be oxygen, nitrogen, argon, carbon monoxide, hydrogen, methane or several of these impurities. The flow can originate, for example, from an oxy-combustion, from a steelworks, from a cement works, from an SMR, and the like.

After the compression to a pressure between 8 and 40 bar abs, the flow is cooled in a cooler, purified from water in the adsorption unit and then sent to be cooled in the exchange line 7, which can be composed of a plate and fin exchanger made of brazed aluminum.

The cold and partially condensed flow is sent to a first phase separator 9. The first liquid 11 from the first phase separator 9 is reduced in pressure in a valve 13 and then sent to a chamber 15 operating at lower pressure than the first phase separator, this chamber being a distillation column.

A liquid very rich in carbon dioxide 17, comprising less in the way of impurities than the flow compressed in the compressor 1, is produced in the distillation column 15.

A gas (not illustrated) rich in at least one impurity exits from the top of the column 15 and can be reheated in the exchange line 7.

The gas 25 from the first phase separator 9 is reheated in the exchange line 7 and compressed in the compressor 27 to form a compressed gas 29 at a pressure between 5 and 50 bar higher than the preceding compression pressure. The gas 29 is cooled in the exchange line 7 and is sent to a second phase separator 31. The second liquid 33 from the second phase separator is reduced in pressure in a valve 35 down to the pressure of the column 15. The gas 36 from the second phase separator 31 is reheated in the exchange line 7, is reduced in pressure in at least one turbine 37 and exits from the appliance as gas.

The exchange line 7, the column 15 and the phase separators 9, 31 are found inside an isolated chamber (not illustrated) in order to make possible the operation at a temperature below ambient temperature.

The cold behavior of the appliance is provided by evaporation of the liquid 17 from the column 15 at three different pressures. The evaporated liquid is subsequently compressed in a compressor 116 and acts as product 118. Other methods for the production of cold can be envisaged.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for purifying a stream rich in carbon dioxide and comprising at least one impurity which is more volatile than carbon dioxide, the process comprising:
   i) cooling and partially condensing the stream in a heat exchanger,
   ii) sending the partially condensed stream to a first phase separator operating at a first pressure,
   iii) reheating, compressing and cooling a gas from the first phase separator and sending the reheated, compressed, cooled gas to a second phase separator operating at a second pressure greater than the first pressure,
   iv) reducing the pressure of a first liquid from the first phase separator and sending the reduced pressure first liquid to a chamber operating at a pressure lower than the first pressure,
   v) reducing the pressure of a second liquid down to the first pressure and sending the reduced pressure second liquid to the first phase separator, and sending a third liquid derived from the second liquid from the first phase separator to the chamber, and
   vi) removing a purified liquid rich in carbon dioxide from the chamber.

2. The process of claim 1, wherein the chamber is a phase separator.

3. The process of claim 1, wherein the chamber is a distillation or washing column.

4. The process of claim 1, wherein the second liquid is reheated in the heat exchanger, then reduced in pressure in a valve down to the pressure of the chamber and sent to the chamber.

5. The process of claim 4, wherein the second phase separator operates at a lower pressure than the second liquid, because of a hydrostatic pressure due to the second phase separator having a position above the inlet of the second liquid into the heat exchanger.

* * * * *